United States Patent Office 3,071,401
Patented Jan. 1, 1963

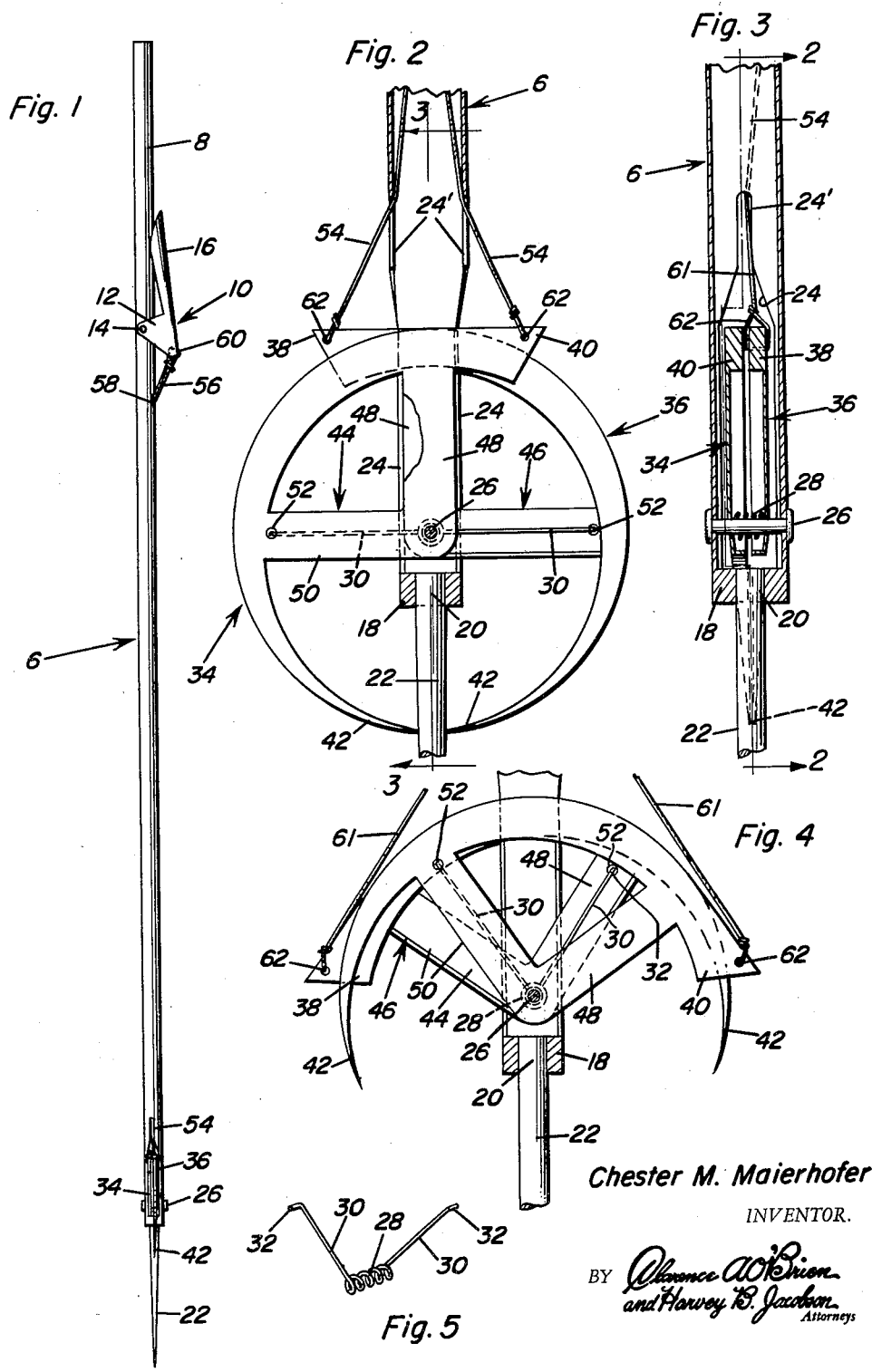

3,071,401
FLOUNDER GIG
Chester M. Maierhofer, 421 Elm St., Seguin, Tex.
Filed Mar. 31, 1960, Ser. No. 18,997
2 Claims. (Cl. 294—61)

The present invention relates to a flounder gig distinguishable from fishing spears in that it is provided with efficient means through the medium of which a speared flounder may be safely lifted and handled.

A flounder, as is known, is a flat sea fish found along our shores. It has a feeding habit that makes it relatively easy to catch with the use of a properly constructed gig, usually a pointed spear on the leading or lower end of a suitably constructed handle. It is the habit of a flounder to swim to the shallow, sandy shores at night and there to lie on the bottom awaiting food. The action of the water causes the sand to cover the flounder lightly. Fishermen and sportsmen go wading at night with bright lights and search for the outline of the fish lightly embedded in the sand and then spear said fish in various manners, after stalking and blinding it with a bright light. Manifestly, when the flounder, or other fish, is thus speared, he naturally thrashes about with animation and stirs up much loose sand and is then not easily viewable. Though the fisherman is equipped with a gig similar to that herein revealed, it is necessary for him to put his hand into the dark water, pass his hand under the fish and lift the fish, hand, and gig at the same time in order not to lose the fish.

It is equally evident that many fishermen fear the stingaree which, as is known, has a sharp barbed spear on its whip-like tail with which it can inflict a very painful, dangerous and sometimes fatal, wound. The stingaree is also found feeding in shallow water and could easily be speared by mistake. It follows that it is an object of the instant invention to equip and so construct the over-all gig that it eliminates the danger of picking up a speared stingaree with the bare hand.

As will be hereinafter evident, the gig herein revealed is such that it is not necessary to put the hand and arm into the water to raise the flounder but merely, after spearing, to squeeze a trip-lever on the upper end near the handle which results in pulling wires in a wire harness, the wires serving to close the claw-like penetrating ends of a novelly constructed and mounted tongs. It follows that the flounder is satisfactorily caught hold of so that it may be raised by merely lifting the gig from the water. Thus, in effect, the gig becomes an extension of the user's arm and provides what is in effect a mechanical hand. By turning the gig point upward the fish may then be easily strung on a fish stringer, keeping the hands almost entirely out of the water. After the fish is removed from the spear it is almost always alive and undamaged.

Briefly summarized, a preferred embodiment of the invention is characterized by an elongated shaft providing a handle at an upper end and having an axially positioned fishspear at the lower end to spear a sand-covered flounder, and flounder grappling and safe-handling tongs operatively and controllably mounted on the spear-equipped end portion of said shaft and embodying normally open jaws or legs having free claw-like piercing ends operatively movable toward and from the spear, whereby the speared flounder, or an unwanted stingaree, may be retained on the spear and lifted without having to touch the prey with the hands.

Novelty is also predicated on the construction above briefly comprehended and wherein the jaws are pivotally mounted on said shaft and are spring-biased to assume said normally open position, trip means mounted on an easily available upper portion of the shaft adjacent the handle, and means providing a linking operating connection between the trip means and the jaws.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in elevation of a gigging implement or tool constructed in accordance with the principles of the present invention;

FIG. 2 is a view in section and elevation on a suitably enlarged scale taken on the plane of the section line 2—2 of FIG. 3, looking in the direction of the arrows;

FIG. 3 is a section at right angles taken on the vertical line 3—3 of FIG. 2;

FIG. 4 is a view similar to FIG. 2 and which shows the jaws in their normally open spring-biased and spring-retained position, that is, in readiness to make the catch; and FIG. 5 is a perspective view of the biasing spring.

In the drawings, the elongated shaft is designated by the numeral 6 and comprises a hollow tube of requisite length, the upper portion of which constitutes a suitable handle 8. Mounted on the handle portion is a hand or trip lever 10 having ears 12 straddling the handle and hingedly connected thereto as at 14. The upper portion of the hand lever is fashioned to provide a suitable grip 16. The lower solid or closed end portion 18 has the upper end 20 of a suitable pointed spear 22 anchored therein in the manner shown in FIGS. 2, 3 and 4. The spear is axially aligned with the tube and the portion of the tube just above the spear is provided with diametrically opposite, longitudinal slots 24. A pivot pin 26 is secured diametrically in the tube and is surrounded by a coil spring 28 having radial outstanding arms or end portions 30 and terminal anchoring members 32.

Although the left and right jaws or legs of the tongs may be of some other construction they are preferably of the generally semi-circular construction shown and said jaws are operable in the slots 24. The one at the left is denoted by the numeral 34 and the one at the right by the numeral 36. However, both jaws are the same in construction. It will be noted that the upper end portions which are tangentially related are denoted by the numerals 38 and 40 respectively. The lower free end portions are directed toward the spear and terminate in penetrating points 42. Each jaw is provided with a substantially L-shaped hub member or angular mounting bracket, the one at the left being designated by the numeral 44 and the one at the right by the numeral 46. Each hub member or mounting bracket is journaled at the angle thereof on the pivot pin 26 and embodies right angularly disposed arms 48 and 50. The arms 30 of the spring parallel the arms 50 and the laterally directed terminal ends 32 are anchored in holes 52 provided therefor in the manner shown best in FIG. 2. In FIGS. 1 and 2 the jaws are shown in closed position. Therefore, the arms 48 of the respective members 44 and 46 overlap each other and are located within the confines of the bore of the tube. Normally, however, the spring means serves to urge and retain the jaws in the open position depicted in FIG. 4 where they stand ready to come into play when operated. A dual wire harness is employed to transfer the motion of the trip lever to the jaws and comprises a pair of similar push-pull wires 54. The major portions of the wires are housed or confined in the hollow portion of the tube. The upper end portions 56 extend outwardly through an opening 58 provided therefor where they are connected as at 60 to the adjacent portion of the trip lever 10. The lower end portions of the wires extend outwardly through and beyond the slots 24 where they are suitably connected as at 62 to the terminal end portions 38 and 40 of the aforementioned upper portions of the jaws 34 and 36. As shown to advantage in FIGURE 3 of the drawing, the slots 24 comprise upper end portions 24' of a reduced width slidably receiving the wires 54 and providing guides therefor. All parts must be made of metal resistant to the corrosive action of sea water. The gig has an over-all length of forty-five (45") inches, consists of five eighths inch (5/8") tubing and attached five inch (5") spear, two claw grips, a spring, a wire harness, and a hand lever which are assembled as illustrated.

As already stated with the gig herein revealed, it is not necessary to put the hand and arm into the water to raise the fish but merely, after spearing, to squeeze the trip lever. This results in transferring the motion of the lever by way of the push-pull wires to the jaws and the jaws are swung on their pivot points to the closed position illustrated in particular in FIG. 2. It will therefore be evident that the trapped fish may now be lifted from the water and then by turning the spear upward the fish may be easily strung on a fish stringer. It follows that the hands are kept almost entirely out of the water. Also, after the fish is removed from the spear it is virtually undamaged and alive.

It is submitted that the invention herein revealed is original, practical, fulfills a long felt need among fishermen. It reduces inconvenience, promotes salable properties and is a definite and effective advance in the art.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling withing the scope of the invention as claimed.

What is claimed as new is as follows:

1. A fish gig comprising an elongated cylindrical tubular shaft including a lower end and an upper end, said subular shaft having diametrically opposite, longitudinal slots therein communicating with the bore thereof and adjacent to said lower end of said shaft, a fish spear fixed in said lower end portion of the shaft and projecting longitudinally therefrom, a pair of tongs mounted on the shaft for retaining a fish impaled on the spear, said tongs including a pivot pin mounted diametrically in the shaft adjacent to the slots and further including arcuate legs operable in said slots and terminating at one end in points for penetrating an impaled fish on opposite sides of the spear, each of said legs including angular mounting brackets spaced inwardly from the ends of each of the legs and journaled at the angles of said brackets on said pivot pin, a coil torsion spring mounted on the pin between the brackets and having at its end operating portions anchored to said tongs, said spring urging said tongs to an open position away from said spear, and means on said upper end operatively connected to said tongs for manually closing them.

2. A fish gig comprising an elongated cylindrical tubuyar shaft including a lower end, said tubular shaft having diametrically opposite longitudinal slots therein communicating with the bore thereof and adjacent to said end of said shaft, a fish spear fixed in said end portion of the shaft and projecting longitudinally therefrom, a pair of tongs mounted on the shaft for retaining a fish impaled on the spear, said tongs including a pivot pin mounted diametrically in the shaft adjacent to the slots and further including arcuate legs operable in said slots and terminating at one end in points for penetrating an impaled fish on opposite sides of the spear, said legs including angular mounting brackets spaced inwardly from the ends of the legs and journaled at the angles of said brackets on the pin, a coil spring mounted on the pin between the brackets and having its end portions anchored to said tongs, said spring urging said tongs to an open position away from said spear, and means remote from said spear for manually closing said tongs, said means comprising a hand lever pivotally mounted on the other end portion of the shaft, and pull wires operable in the shaft and operatively connecting said lever to the tong legs at the other ends thereof, said slots having upper end portions of a reduced width slidably receiving the wires and providing guides therefor, said shaft further having an opening therein adjacent to the handle slidably accommodating said wires.

References Cited in the file of this patent

UNITED STATES PATENTS

| | | |
|---|---|---|
| 515,875 | Dreese | Mar. 6, 1894 |
| 964,375 | Bjornseth | July 12, 1910 |
| 1,080,868 | Turner | Dec. 9, 1913 |
| 2,492,884 | Leigh | Oct. 28, 1947 |

FOREIGN PATENTS

| | | |
|---|---|---|
| 456,988 | Canada | May 31, 1949 |
| 1,013,845 | France | May 7, 1952 |
| 1,115,015 | France | Apr. 18, 1956 |
| 145,432 | Sweden | May 25, 1954 |